(12) United States Patent
Ito et al.

(10) Patent No.: US 11,635,047 B2
(45) Date of Patent: Apr. 25, 2023

(54) FLOW CONTROL VALVE AND EVAPORATED FUEL PROCESSING DEVICE

(71) Applicant: AISAN KOGYO KABUSHIKI KAISHA, Obu (JP)

(72) Inventors: Koma Ito, Nagoya (JP); Shinji Murai, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/850,568

(22) Filed: Jun. 27, 2022

(65) Prior Publication Data

US 2023/0003180 A1 Jan. 5, 2023

(30) Foreign Application Priority Data

Jul. 5, 2021 (JP) .............................. JP2021-111423

(51) Int. Cl.
*F02M 25/08* (2006.01)
*F16K 31/04* (2006.01)
*F16K 1/02* (2006.01)

(52) U.S. Cl.
CPC .... *F02M 25/0836* (2013.01); *F02M 25/0854* (2013.01); *F16K 1/02* (2013.01); *F16K 31/047* (2013.01)

(58) Field of Classification Search
CPC .. F02M 25/0836; F02M 25/0854; F16K 1/02; F16K 31/047
See application file for complete search history.

(56) References Cited

U.S. PATENT DOCUMENTS

| 9,803,593 B2 * | 10/2017 | Kimoto | F02M 25/08 |
| 2019/0376607 A1 * | 12/2019 | Makino | B60K 15/035 |
| 2020/0408308 A1 * | 12/2020 | Oike | F16K 1/42 |

FOREIGN PATENT DOCUMENTS

| JP | 5996799 B2 | 9/2016 |
| JP | 2019163810 A | 9/2019 |

* cited by examiner

*Primary Examiner* — Xiao En Mo
(74) *Attorney, Agent, or Firm* — Conley Rose, P.C.

(57) ABSTRACT

A flow control valve may include a housing including a fluid-flow channel, a valve seat including a valve hole and positioned in the fluid-flow channel, an electric motor disposed in the housing, and a valve body configured to be axially moved toward and away from the valve seat by the electric motor via a feed screw mechanism. The valve body includes a straight projecting portion. The projecting portion is configured to be positioned in the valve hole in an initial valve body lifting range in which a lift distance of the valve body relative to the valve seat is not greater than a predetermined lift distance.

4 Claims, 5 Drawing Sheets

FLOW CONTROL VALVE AND EVAPORATED FUEL PROCESSING DEVICE

CROSS-REFERENCE TO RELATED APPLICATIONS

This application claims priority to a Japanese Patent Application Serial Number 2021-111423 filed Jul. 5, 2021, which is hereby incorporated herein by reference in its entirety for all purposes.

BACKGROUND

The present disclosure relates generally to a flow control valve and an evaporated fuel processing device including the flow control valve.

Conventionally, a vehicle equipped with an internal-combustion engine may generally include an evaporated fuel processing device configured to process evaporated fuel generated in a fuel tank of the vehicle. In particular, the evaporated fuel processing device is configured to adsorb the evaporated fuel in a canister and to desorb the adsorbed evaporated fuel, thereby introducing (purging) the desorbed evaporated fuel into the engine. Such an evaporated fuel processing device typically includes a vapor conduit communicating between the fuel tank and the canister, a shut-off valve (which may be referred to as a flow control valve) configured to open and close the vapor conduit, and a float valve configured to prevent fuel contained in the fuel tank from flowing into the vapor conduit.

The shut-off valve may include a casing including a fluid-flow channel, a valve seat disposed in the fluid-flow channel and having a valve hole, an electric motor disposed in the casing, and a valve body disposed in the casing and configured to be axially moved toward and away from the valve seat. The valve body is configured such that a lift distance (stroke) thereof may be controlled by the electric motor via a feed screw mechanism, thereby opening and closing the valve hole of the valve seat. Thus, the valve hole of the valve body is controllably opened and closed by controlling the lift distance of the valve body. That is, an opening area or effective flow passage area of the fluid-flow channel (i.e., a flow rate of the evaporated fuel flowing through the fluid-flow channel) is controlled only by controlling the lift distance of the valve body. Therefore, the shut-off valve exhibits linear characteristics in which the flow rate of the evaporated fuel flowing through the fluid-flow channel is linearly or proportionally changed with respect to the lift distance of the valve body.

Generally, when a refueling operation is performed, a depressurizing operation of the fuel tank is performed prior to start of the refueling operation. That is, the shut-off valve is opened so as to reduce a tank inner pressure of the fuel tank before a filler cap attached to a filler pipe of the fuel tank is removed.

SUMMARY

In one aspect of the present disclosure, a flow control valve includes a housing including a fluid-flow channel, a valve seat positioned in the fluid-flow channel and including a valve hole, an electric motor disposed in the housing, and a valve body configured to be axially moved toward and away from the valve seat by the electric motor via a feed screw mechanism. The valve body includes a straight projecting portion. The projecting portion is positioned in the valve hole in an initial valve body lifting range in which a lift distance of the valve body relative to the valve seat is not greater than a predetermined lift distance.

According to the aspect, a flow rate of fluids flowing through the fluid-flow channel may be prevented from increasing in a portion of the initial valve body lifting range. That is, the flow rate of the fluids flowing through the fluid-flow channel may be strictly controlled in the initial valve body lifting range of the valve body.

Further, in another aspect of the present disclosure, an evaporated fuel processing device configured to process evaporated fuel generated in a fuel tank of a vehicle equipped with an internal-combustion engine may include a canister configured to adsorb and desorb the evaporated fuel, a vapor conduit connecting the canister and the fuel tank, a flow control valve configured to open and close the vapor conduit, and a float valve configured to prevent fuel in the fuel tank from flowing into the vapor conduit. The flow control valve comprises a housing including a fluid-flow channel, a valve seat positioned in the fluid-flow channel and including a valve hole, an electric motor disposed in the housing, and a valve body configured to be axially moved toward and away from the valve seat by the electric motor via a feed screw mechanism. The valve body includes a straight projecting portion. The projecting portion is configured to be positioned in the valve hole in an initial valve body lifting range in which a lift distance of the valve body relative to the valve seat is not greater than a predetermined lift distance.

Other objects, features, and advantages, of the present disclosure will be readily understood after reading the following detailed description together with the accompanying drawings and the claims.

DETAILED DESCRIPTION

As previously described, when a refueling operation is performed, a depressurizing operation of a fuel tank is performed prior to start of the refueling operation. That is, a shut-off valve is opened so as to reduce a tank inner pressure of the fuel tank before a filler cap attached to a filler pipe of the fuel tank is removed. However, in a conventional shut-off valve, if the shut-off valve is quickly opened, evaporated fuel within the fuel tank may swiftly flow into the vapor conduit, thereby producing a large dynamic pressure within the vapor conduit. The float valve may be closed in response to the dynamic pressure. However, if the float valve is closed during the depressurizing operation of the fuel tank, such a depressurizing operation cannot be performed smoothly. Thus, there is a need in the art for an improved shut-off valve (i.e., flow control valve) and an improved evaporated fuel processing device including such an improved shut-off valve.

In the following, a detailed representative embodiment of the present disclosure will be described with reference to FIGS. 1 to 6. This embodiment is directed to a shut-off valve or flow control valve and an evaporated fuel processing device including the shut-off valve, which may be used in an engine system of a vehicle (automobile).

Figure 1:
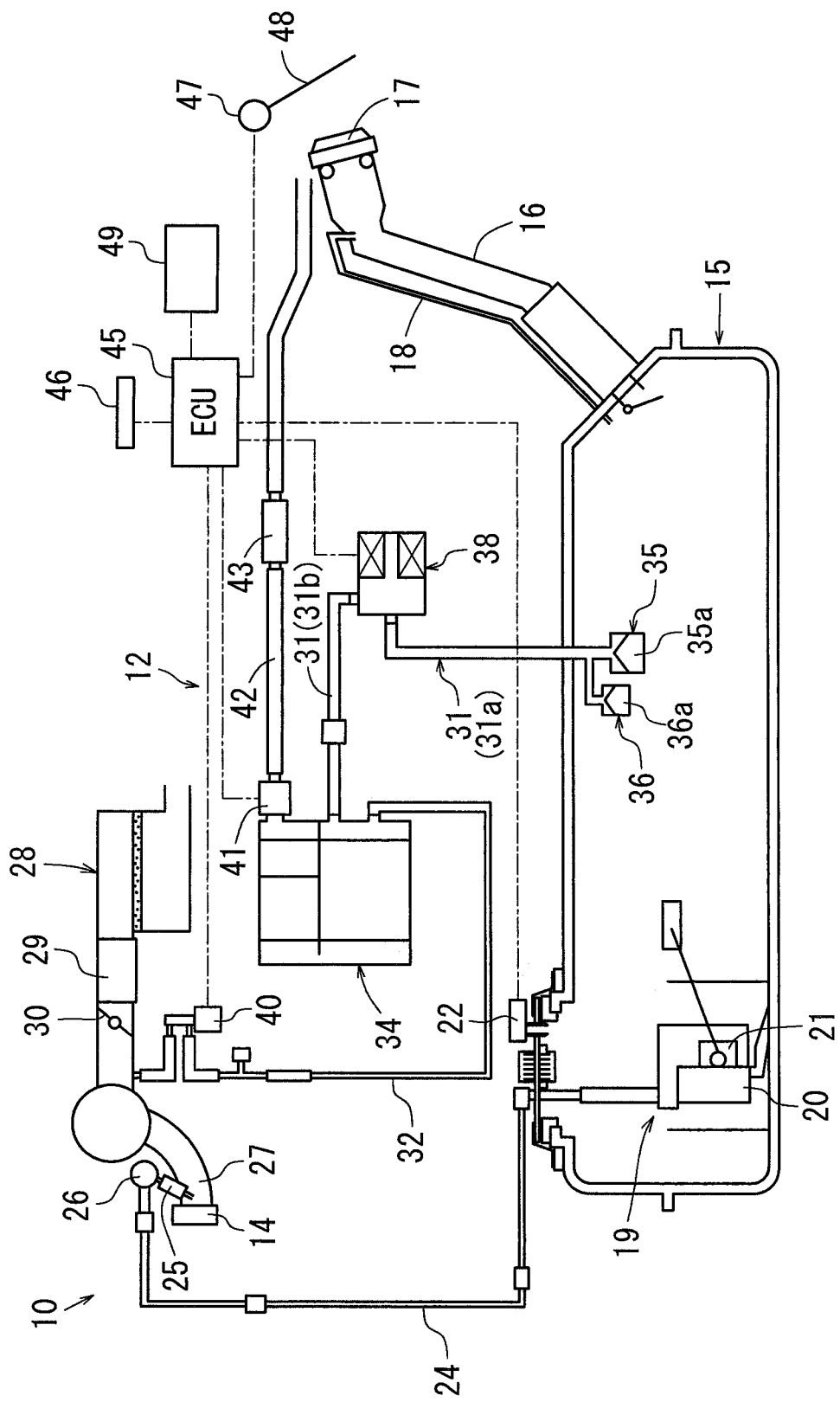
FIG. 1 is a schematic view of an embodiment of a fuel system including an evaporated fuel processing device having a flow control valve in accordance with the present disclosure.

As shown in FIG. 1, the evaporated fuel processing device (labeled with a reference numeral 12) is included in an engine system (labeled with a reference numeral 10) of the vehicle. The engine system 10 includes an engine (internal-combustion engine) 14 and a fuel tank 15 that stores fuel to be fed to the engine 14. The fuel tank 15 has a filler pipe 16 connected thereto. The filler pipe 16 has an enlarged filler pipe opening formed on an upper end thereof. The filler pipe opening is equipped with a detachable filler cap 17. Further, the upper end of the filler pipe 16 is in fluid communication with a gas phase in the fuel tank 15 via a breather pipe 18.

As shown in FIG. 1, the fuel tank 15 is provided with a fuel-feeding device 19 disposed therein. The fuel-feeding device 19 includes a fuel pump 20 configured to suck up the fuel stored in the fuel tank 15 and to pressurize and discharge the fuel, a fuel sender gauge 21 configured to detect a fuel level in the fuel tank 15, and a tank inner pressure sensor 22 configured to detect the pressure within the fuel tank 15 as a relative pressure relative to an atmospheric pressure. The fuel sucked up from the fuel tank 15 by the fuel pump 20 is fed to the engine 14, in particular, to a delivery pipe 26 having injectors 25 corresponding to combustion chambers of the engine 14. The fuel is then injected into an induction conduit 27 by the injectors 25. Further, the induction conduit 27 is provided with an air cleaner 28, an air flow meter 29, and a throttle valve 30.

As shown in FIG. 1, the evaporated fuel processing device 12 includes a vapor conduit 31, a purge conduit 32, and a canister 34. The canister 34 is in fluid communication with the gas phase in the fuel tank 15 via the vapor conduit 31. The canister 34 is in fluid communication with the induction conduit 27 via the purge conduit 32. The canister 34 is filled with activated carbon (not shown), which functions as a fuel vapor adsorbing material. The evaporated fuel generated in the fuel tank 15 is introduced into the canister 34 via the vapor conduit 31 and is then adsorbed by the adsorbing material (the activated carbon).

As shown in FIG. 1, the vapor conduit 31 is provided with an ORVR (On Board Refueling Vapor Recovery) valve 35 and a cut off valve 36 that are attached to an upstream end thereof. The upstream end of the vapor conduit 31 is introduced into the fuel tank 15 in such a manner that the ORVR valve 35 and the cut off valve 36 are positioned in the gas phase in the fuel tank 15.

The ORVR valve 35 is a full tank fuel level limiting valve device having a float 35a configured to open and close due to a buoyancy force of the fuel in the fuel tank 15. The ORVR valve 35 is configured such that the float 35a closes a passage leading into the vapor conduit 31 when a fuel level of the fuel tank 15 reaches a full tank fuel level, thereby preventing the fuel in the fuel tank 15 from flowing into the vapor conduit 31. When the ORVR valve 35 is closed during refueling, the refueling operation is eventually stopped due to an automatic stop mechanism of a fuel filling nozzle.

The cut off valve 36 has a float 36a configured to open and close due to a buoyancy force of the fuel in the fuel tank 15. The cut off valve 36 is configured such that the float 36a closes the passage leading into the vapor conduit 31 when the fuel level of the fuel tank 15 reaches a predetermined level (e.g., when the fuel tank 15 is inclined at an angle greater than a predetermined angle by a rollover accident of the vehicle), thereby preventing the fuel in the fuel tank 15 from flowing into the vapor conduit 31. Further, the cut off valve 36 is positioned at a vertical position or level higher than the ORVR valve 35. The cut off valve 36 and the ORVR valve 35 may each be referred to as a float valve.

As shown in FIG. 1, the vapor conduit 31 is provided with a shut-off valve 38. The shut-off valve 38 is a motor-operated valve including a stepping motor. The shut-off valve 38 is configured to control an axial movement or stroke of a valve body thereof, thereby controlling a lift amount or distance of the valve body (i.e., a valve opening degree). The shut-off valve 38 will be described in more detail below.

As shown in FIG. 1, the purge conduit 32 is provided with a purge valve 40. The purge valve 40 is a motor-operated valve including a stepping motor. The purge valve 40 is configured to control a stroke of a valve body thereof, thereby controlling the degree of valve opening. Alternatively, the purge valve 40 may be a solenoid valve including an electromagnetic solenoid configured to be closed in a non-energized condition and to be opened in an energized condition.

As shown in FIG. 1, the canister 34 is provided with a selector valve 41 and an atmospheric conduit 42 extends from the selector valve 41. The selector valve 41 is a solenoid valve including an electromagnetic solenoid configured to be closed in a non-energized condition and to be opened in an energized condition. The atmospheric conduit 42 is open to the atmosphere and is provided with an air filter 43.

As shown in FIG. 1, the shut-off valve 38, the purge valve 40, and the selector valve 41 are electrically connected to an ECU (engine control unit) 45. The ECU 45 is electrically connected to a tank inner pressure sensor 22, a lid switch 46, a lid opener 47, and a display device 49. The lid opener 47 is a locking device attached to a vehicle body (not shown) and configured to lock or unlock a lid 48 for covering the filler pipe opening equipped with the filler cap 17. Further, the lid opener 47 is connected to a manual lid opening and closing device (not shown) that is configured to manually open or close the lid 48.

When the lid switch 46 is manipulated to open the lid 48, a corresponding signal is sent to the ECU 45. Consequently, the lid opener 47 can be activated based on the signal from the ECU 45, so as to unlock the lid 48. Further, the lid opener 47 may also be activated when the lid 48 is opened by manipulating the manual lid opening and closing device. The ECU 45 may also be referred to herein as a control device.

Before describing the shut-off valve 38, a basic operation of the evaporated fuel processing device 12 will be described.

In a condition in which the vehicle is parked (i.e., the engine 14 is stopped), the shut-off valve 38, the purge valve 40, and the selector valve 41 are in a closed condition. Because the shut-off valve 38 is closed, the evaporated fuel in the fuel tank 15 is prevented from flowing into the canister 34. Conversely, air in the canister is prevented from flowing into the fuel tank 15.

In a condition in which the vehicle is moving, the ECU 45 performs an operation to purge the evaporated fuel adsorbed in the canister 34 provided that predetermined purging conditions are met. In such a purging operation, the purge valve 40 is controlled while the selector valve 41 is kept in an open condition. When the purge valve 40 is opened, a manifold vacuum pressure of the engine 14 is applied to the canister 34 via the purge conduit 32. As a result, the evaporated fuel in the canister 34 is purged into the induction conduit 27 with air inhaled through the atmospheric conduit 42, so as to be combusted in the engine 14. Further, the ECU 45 may hold the shut-off valve 38 in an open condition only for a period of time during a purging operation, thereby holding the inner pressure of the fuel tank 15 close to atmospheric pressure.

In a condition in which the vehicle is stopped, when the lid switch 46 is manipulated for performing a refueling operation, the shut-off valve 38 is opened by the ECU 45. At this time, if the tank inner pressure of the fuel tank 15 is greater than atmospheric pressure, the evaporated fuel in the fuel tank 15 can be introduced into the canister 34 through the vapor conduit 31 at the same time when the shut-off valve 38 is opened, so as to be adsorbed by the adsorbing material in the canister 34. Thus, the evaporated fuel is prevented from being released to the atmosphere. Consequently, the inner pressure of the fuel tank 15 can be reduced to a pressure close to atmospheric pressure.

When the inner pressure of the fuel tank 15 is reduced to a pressure close to atmospheric pressure, the ECU 45 sends the signal for unlocking the lid 48 to the lid opener 47. The lid opener 47 may be activated based on the signal from the ECU 45, so as to unlock the lid 48. As a result, the lid 48 is placed in a condition in which it can be opened. In this condition, the filler cap 17 is removed after the lid 48 is opened, so that the refueling operation can be performed. The ECU 45 holds the shut-off valve 38 in the open condition until the refueling operation is completed (in particular, until the lid 48 is closed). Therefore, the evaporated fuel generated in the fuel tank 15 can be introduced into the canister 34 through the vapor conduit 31, so as to be adsorbed by the adsorbing material in the canister 34.

Next, the shut-off valve 38 will be described. Further, rightward, leftward, upward and downward directions described with reference to the figures may be defined simply for descriptive purposes.

Figure 2:
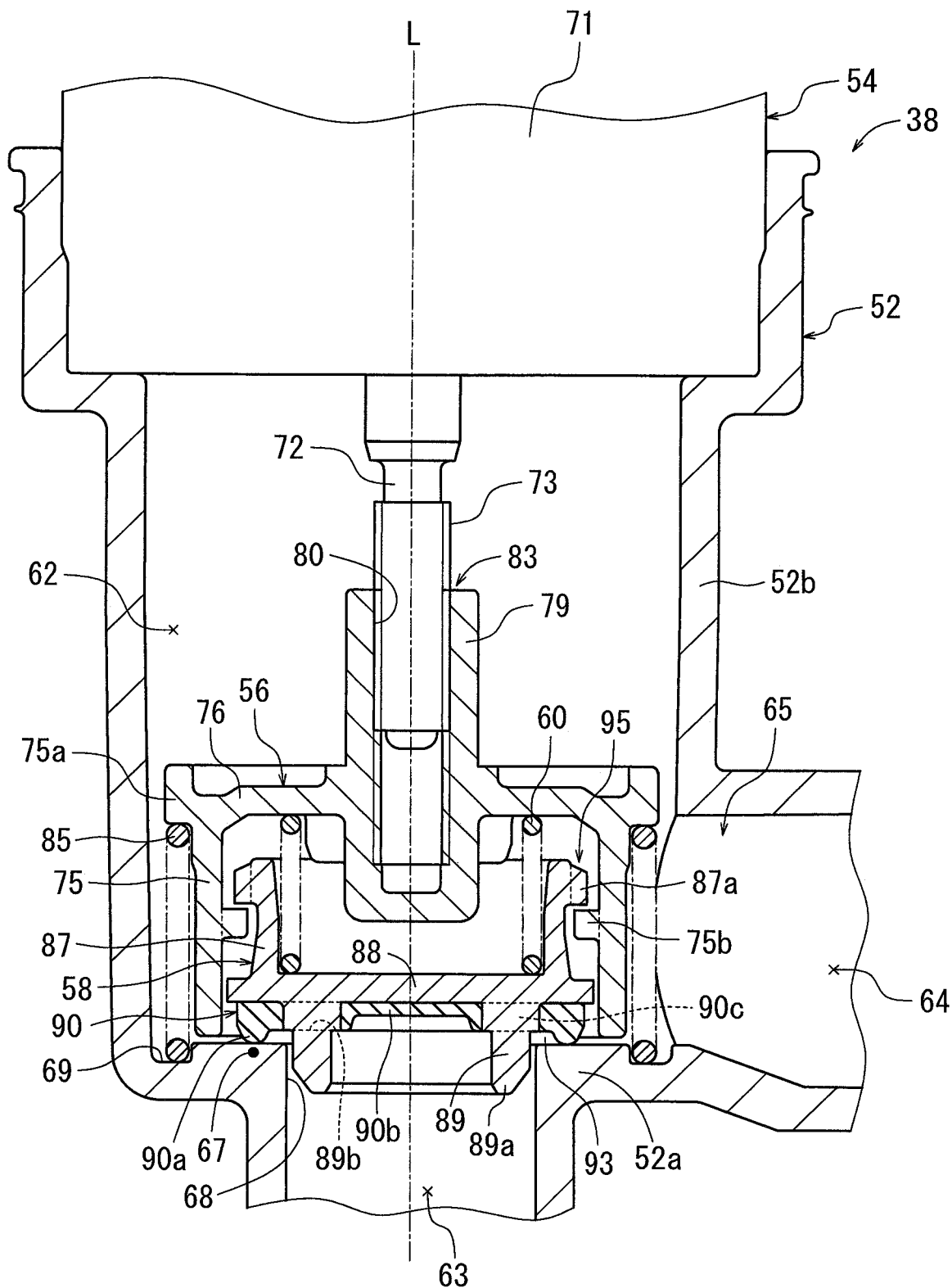
FIG. 2 is a cross-sectional view of the flow control valve of FIG. 1 illustrating a valve closed condition.

As shown in FIG. 2, the shut-off valve 38 includes a housing 52, an electric motor 54, a guide member 56, a valve body 58, and a valve spring 60. The housing 52 includes a cylindrical valve chamber 62 formed therein and having a vertically oriented central axis line L. The housing 52 has a vertically oriented cylindrical inlet port 63 concentrically formed in a central portion of a bottom wall 52a thereof and in fluid communication with the valve chamber 62. The housing 52 also includes a lateral (rightward) cylindrical outlet port 64 in a lower portion of a circumferential wall 52b thereof and in fluid communication with the valve chamber 62. The inlet port 63, the valve chamber 62, and the outlet port 64 define an inverted L-shaped fluid-flow passage or channel 65. Thus, the housing 52 includes the fluid-flow channel 65 formed therein and positioned on a lower portion thereof.

The inlet port 63 is coupled to and in fluid communication with a downstream (fuel tank-side) portion 31a of the vapor conduit 31 (FIG. 1), while the outlet port 64 is coupled to and in fluid communication with an upstream (canister-side) portion 31b of the vapor conduit 31 (FIG. 1).

As shown in FIG. 2, the housing 52 has a valve seat 67 formed on the bottom wall 52a of the housing 52 (i.e., a bottom surface of the valve chamber 62). The valve seat 67 surrounds an upper opening of the inlet port 63. That is, the upper opening of the inlet port 63 defines a circular valve hole 68 of the valve seat 67. The valve seat 67 has a flat upper surface oriented perpendicular to the central axis line L of the valve chamber 62. Further, the housing 52 has an annular spring seating groove 69 formed in the bottom wall 52a of the housing 52 and extending about the valve seat 67.

As shown in FIG. 2, the electric motor 54 is a stepping motor configured to be controllably operated and driven by the ECU 45 (FIG. 1). The electric motor 54 has a motor main body 71 positioned at an upper portion of the housing 52. The electric motor 54 has an output rotational shaft 72 extending downward from the motor main body 71 and configured to rotate in forward and reverse rotational directions. The output rotational shaft 72 is concentrically positioned in the valve chamber 62 of the housing 52. The output rotational shaft 72 has a male externally threaded portion 73 formed on an outer circumferential surface thereof.

As shown in FIG. 2, the guide member 56 includes a cylindrical wall portion 75 having a vertically oriented axis line (which corresponds to a central axis of the guide member 56), an upper wall portion 76 closing an upper portion of the cylindrical wall portion 75, and a bottomed cylindrical shaft portion 79 formed on a central portion of the upper wall portion 76. The cylindrical wall portion 75, the upper wall portion 76, and the cylindrical shaft portion 79 are concentrically arranged. Further, the cylindrical shaft portion 79 is arranged such that a closed bottom portion thereof is positioned below the upper wall portion 76 within the cylindrical wall portion 75. The cylindrical shaft portion 79 has a female internally threaded portion 80 formed on an inner circumferential surface thereof that threadably engages the mating male thread portion 73 of the output rotational shaft 72. Further, the cylindrical wall portion 75 has an annular flange portion 75a formed on an upper peripheral edge thereof and projected radially outward.

As shown in FIG. 2, the guide member 56 is disposed in the valve chamber 62 of the housing 52. In particular, the guide member 56 is concentrically disposed in the valve chamber 62 of the housing 52. Further, the guide member 56 is configured to move or reciprocate vertically (axially) up and down while being prevented from rotating about the axis line thereof by a rotation preventing device (not shown). The cylindrical shaft portion 79 of the guide member 56 is coupled to the output rotational shaft 72 of the electric motor 54 by threaded engagement of the female thread portion 80 of the cylindrical shaft portion 79 and the male thread portion 73 of the output rotational shaft 72. Therefore, when the electric motor 54 is activated to rotate the output rotational shaft 72 in forward and reverse rotational directions, the guide member 56 moves or reciprocates vertically (axially) so as to be lifted up and lowered relative to the housing 52 and valve seat 67. Thus, the female thread portion 80 of the cylindrical shaft portion 79 and the male thread portion 73 of the output rotational shaft 72 constitute a feed screw mechanism 83 that functions to convert forward and reverse rotational motion of the output rotational shaft 72 to axial reciprocating motion of the guide member 56.

As shown in FIG. 2, an assisting spring 85 is positioned between the annular flange portion 75a formed on the cylindrical wall portion 75 of the guide member 56 and the annular spring seating groove 69 formed in the bottom wall 52a of the housing 52. The assisting spring 85 is a coil spring. The assisting spring 85 biases the guide member 56 upward, thereby preventing possible backlash in the feed screw mechanism 83.

As shown in FIG. 2, the valve body 58 includes a cylindrical portion 87 having a vertically oriented axis line (which corresponds to a central axis of the valve body 58), and a lower wall portion 88 closing a lower portion of the cylindrical portion 87. The lower wall portion 88 has an outer diameter greater than an outer diameter of the cylindrical portion 87. The cylindrical portion 87 and the lower wall portion 88 are concentrically arranged.

As shown in FIG. 2, the valve body 58 includes a straight hollow cylindrical projecting portion 89. The hollow cylindrical projecting portion 89 is concentrically formed on the lower wall portion 88 of the valve body 58 so as to extend downward therefrom. The hollow cylindrical projecting portion 89 has an outer diameter smaller than an inner diameter of the valve hole 68 of the valve seat 67. Further, the hollow cylindrical projecting portion 89 is configured such that an outer circumferential surface thereof is slightly tapered (i.e., reduced in diameter) toward a distal (lower) end thereof. In addition, the hollow cylindrical projecting portion 89 has a tapered chamfered portion 89a formed in the distal (lower) end thereof. Further, the hollow cylindrical projecting portion 89 includes a plurality of (two in this embodiment) communicating holes 89b formed in a proximal end thereof. The communicating holes 89b radially transversely penetrate the hollow cylindrical projecting portion 89 along the lower wall portion 88 of the valve body 58. The hollow cylindrical projecting portion 89 may also be referred to herein as a projecting portion.

As shown in FIG. 2, the valve body 58 includes a circular plate-shaped sealing member 90 attached to a lower surface of the lower wall portion 88. The sealing member 90 is made of a rubber-like elastic material. The sealing member 90 includes an outer annular sealing portion 90a, an inner plate portion 90b, and a connecting portion 90c. The sealing portion 90a is disposed about, encircles, and covers the upper, proximal end of the hollow cylindrical projecting portion 89 from outside. The sealing portion 90a includes an annular rounded sealing projection formed therealong. The plate portion 90b covers the proximal end of the hollow cylindrical projecting portion 89 from inside. The connecting portion 90c fills the communicating hole 89b of the hollow cylindrical projecting portion 89. Thus, the sealing portion 90a and the plate portion 90b are connected to each other via the connecting portion 90c.

As shown in FIG. 2, the valve body 58 is concentrically disposed in the cylindrical wall portion 75 of the guide member 56. Further, the valve body 58 is configured to move vertically or axially while being prevented from rotating about the axis line thereof. That is, the valve body 58 is configured to be axially moved toward and away from (i.e. lifted or lowered relative to) the valve seat 67 with the guide member 56. Further, the hollow cylindrical projecting portion 89 of the valve body 58 is configured to be introduced into and withdrawn from the valve hole 68 of the valve seat 67 when the valve body 58 is moved toward and away from the valve seat 67. Conversely, the sealing member 90 attached to the valve body 58 is configured such that the sealing portion 90a thereof is brought into contact with (seated on) and spaced apart from the valve seat 67 when the valve body 58 is moved toward and away from the valve seat 67.

Figure 5:
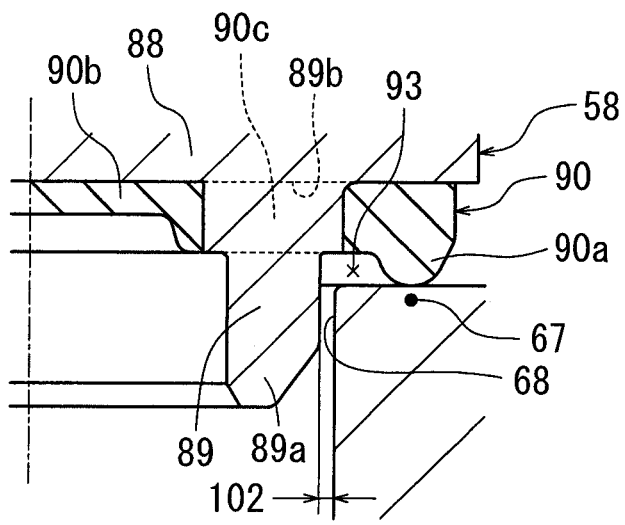
FIG. 5 is an enlarged partial view of the flow control valve of FIG. 2.

As shown in FIGS. 2 and 5, in a condition in which the valve body 58 is seated on the valve seat 67 (i.e., the sealing portion 90a of the sealing member 90 contacts the valve seat 67), an annular cavity or hollow portion 93 is formed by the valve seat 67, the hollow cylindrical projecting portion 89, and the sealing portion 90a of the sealing member 90. As shown in FIG. 5, the hollow portion 93 is in fluid communication with an annular space 102 formed between the cylindrical inner surface of the valve seat 67 that defines the valve hole 68 and the outer circumferential surface of the hollow cylindrical projecting portion 89. Therefore, fluids (evaporated fuel containing gases) can enter the hollow portion 93 through the space 102. The hollow portion 93 has a transverse sectional area (i.e., effective flow passage area) greater than a transverse sectional area (i.e., flow passage area) of the annular space 102.

As shown in FIG. 2, the valve spring 60 is a coil spring. The valve spring 60 is concentrically positioned in the cylindrical portion 87 of the valve body 58. Further, the valve spring 60 is sandwiched between the lower wall portion 88 of the valve body 58 and the upper wall portion 76 of the guide member 56 while being vertically compressed therebetween. That is, the valve spring 60 vertically bias the guide member 56 and the valve body 58 axially apart. The valve spring 60 may also be referred to herein as a "biasing device".

As shown in FIG. 2, the guide member 56 and the valve body 58 further include a plurality of (four in this embodiment) circumferentially-spaced coupling mechanisms 95. The coupling mechanisms 95 are configured to couple the guide member 56 with the valve body 58 such that the guide member 56 and the valve body 58 can vertically move in combination with each other only within a predetermined range of motion. The coupling mechanisms 95 includes a plurality of stopper projections 75b formed on the inner surface of the guide member 56 and a plurality of engagement projections 87a formed on the outer surface of the valve body 58. The stopper projections 75b are circumferentially spaced at intervals along an inner circumferential surface of the cylindrical wall portion 75 of the guide member 56, and the engagement projections 87a are circumferentially spaced at intervals along an outer circumferential surface of the cylindrical portion 87 of the valve body 58. The engagement projections 87a are positioned above the stopper projections 75b, and the stopper projections 75b and the engagement projections 87a are vertically aligned with each other.

Figure 3:
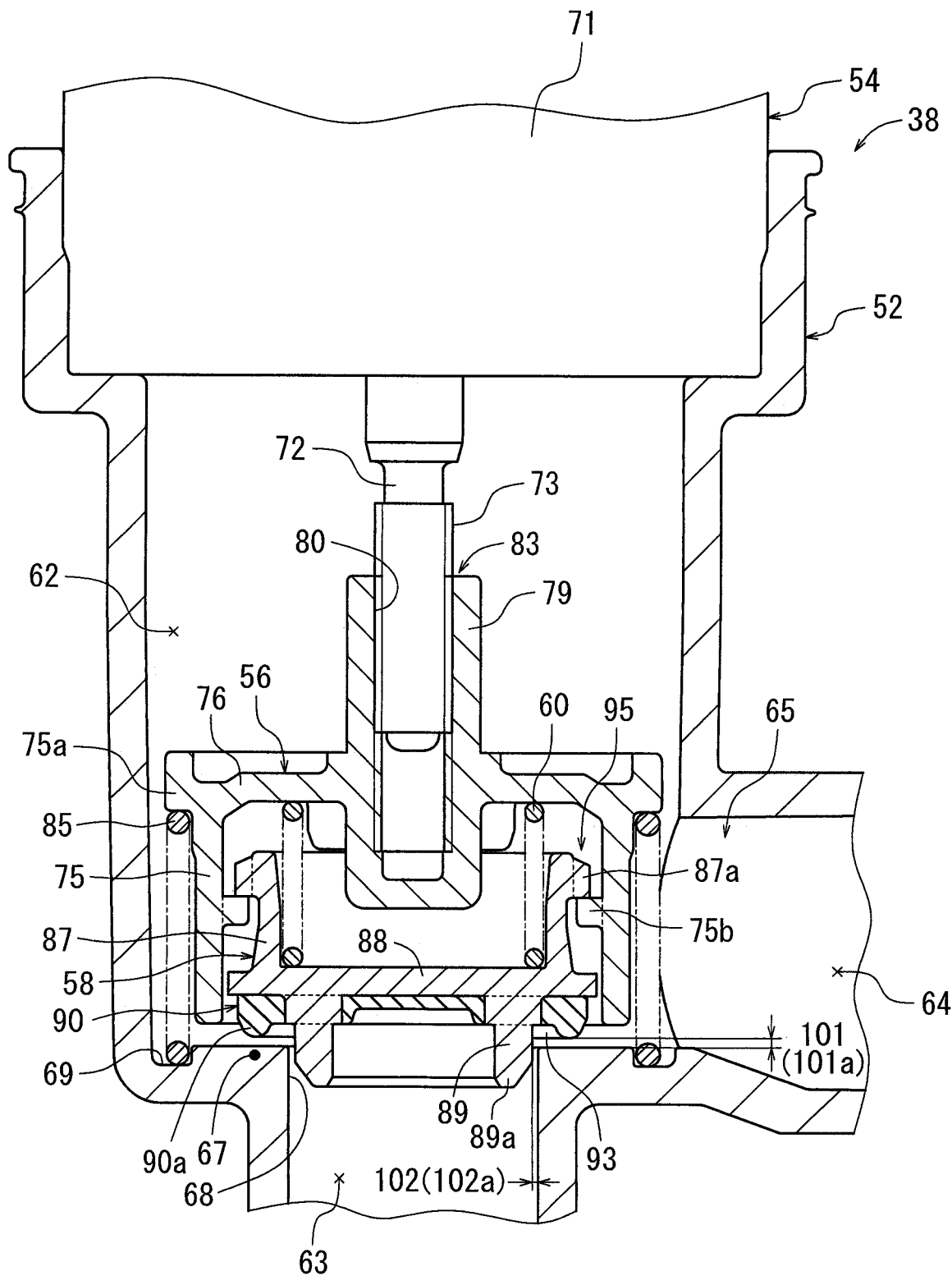
FIG. 3 is a cross-sectional view of the flow control valve of FIG. 1 illustrating a valve half-opened condition.

When the guide member 56 is lifted up, the engagement projections 87a engage the stopper projections 75b due to the spring force of the valve spring 60 (FIG. 3). Thus, the valve body 58 is engaged with or coupled to the guide member 56. To the contrary, when the guide member 56 is fully lowered, the engagement projections 87a are disengaged from the stopper projections 75b against the spring force of the valve spring 60 (FIG. 2). Thus, the valve body 58 is separated from or decoupled from the guide member 56.

Next, an operation of the shut-off valve 38 will be described. First, when the shut-off valve 38 is held in a valve closed condition due to energization of the electric motor 54, the valve body 58 is seated on the valve seat 67 due to the spring force of the valve spring 60 (FIG. 2). In particular, the sealing portion 90a of the sealing member 90 engages and is elastically pressed against the valve seat 67. Thus, the valve body 58 hermetically contacts the valve seat 67. In this condition, the hollow cylindrical projecting portion 89 of the valve body 58 is introduced into the valve hole 68 of the valve seat 67. Further, the stopper projections 75b of the guide member 56 and the engagement projections 87a of the valve body 58 are spaced apart from each other. That is, the valve body 58 is not coupled with the guide member 56 via the coupling mechanisms 95.

Generally, in the valve closed condition of the shut-off valve 38, even if the electric motor 54 is de-energized, the shut-off valve 38 can be held in the valve closed condition due to a detent torque of the electric motor 54, a lead angle of the feed screw mechanism 83 (the male thread portion 73 and the female thread portion 80), or other such factors. Further, an axial length of the housing 52 may slightly change in response to changes in temperatures. For example, the length of the housing 52 may be increased due to thermal expansion. In such a case, a distance (interval) between the electric motor 54 and the valve seat 67 may be increased. As a result, the guide member 56 may move upward relative to the valve seat 67. However, the valve body 58 is prevented from moving due to the spring force of the valve spring 60. Thus, the valve body 58 may be reliably seated on the valve seat 67. To the contrary, the length of the housing 52 may be reduced due to thermal contraction. In such a case, the distance (interval) between the electric motor 54 and the valve seat 67 may be reduced. As a result, the guide member 56 may move downward toward the valve seat 67. However, the valve body 58 may be prevented from being excessively pressed to the valve seat 67 due to the spring force of the valve spring 60. Thus, the valve body 58 may be prevented from being damaged.

In the valve closed condition of the shut-off valve 38, when the electric motor 54 is energized by the ECU 45 for performing a valve-opening operation of the shut-off valve 38, the guide member 56 is lifted up via the feed screw mechanism 83 while the valve spring 60 expands due to a restoring force thereof. Subsequently, after the stopper projections 75b of the guide member 56 contact or engage the engagement projections 87a of the valve body 58 (i.e. after the valve body 58 is coupled with the guide member 56 via the coupling mechanisms 95), the guide member 56 is lifted up with the valve body 58. That is, the valve body 58 is axially moved by the electric motor 54 via the feed screw mechanism 83, so as to be lifted up relative to the valve seat 67. As a result, the sealing portion 90a of the sealing member 90 attached to the valve body 58 is gradually spaced apart from the valve seat 67. Thus, the shut-off valve 38 starts to be opened.

As shown in FIG. 3, in an early stage of the valve-opening operation in which the valve body 58 is slightly lifted up, a clearance gap 101 is formed between the valve seat 67 and the sealing portion 90a of the sealing member 90. The clearance gap 101 is in fluid communication with the annular space 102 formed between the valve hole 68 of the valve seat 67 and the outer circumferential surface of the hollow cylindrical projecting portion 89 via the hollow portion 93. Thereafter, as a lift distance of the valve body 58 relative to the valve seat 67 is increased, a flow passage area of the clearance gap 101 is increased. The clearance gap 101 may function as a first bottleneck or squeezing portion 101a until the flow passage area thereof exceeds the flow passage area of the annular space 102. This means that an effective flow passage area of the fluid-flow channel 65 of the shut-off valve 38 increases in proportion to the lift distance of the valve body 58. In particular, a flow rate of the fluids flowing through the fluid-flow channel 65 may linearly increase with respect to the lift distance of the valve body 58. Further, the lift distance of the valve body 58 corresponds to a number of steps of the electric motor 54.

Thereafter, when the flow passage area of the clearance gap 101 exceeds the flow passage area of the annular space 102, the annular space 102 function as a second bottleneck or squeezing portion 102a. As a result, even if the lift distance of the valve body 58 continues to be increased, the effective flow passage area of the fluid-flow channel 65 of the shut-off valve 38 is static and prevented from being increased. Therefore, the flow rate of the fluids flowing through the fluid-flow channel 65 are substantially prevented from being increased with increase in the lift distance of the valve body 58. Such a condition continues until the hollow cylindrical projecting portion 89 of the valve body 58 is withdrawn from the valve hole 68 of the valve seat 67. Thus, in a valve body lifting range before the hollow cylindrical projecting portion 89 of the valve body 58 is withdrawn from the valve hole 68 of the valve seat 67 after the valve-opening operation is started, when the lift distance of the valve body 58 is increased, the effective flow passage area of the fluid-flow channel 65 of the shut-off valve 38 is restrictively increased due to the first squeezing portion 101a and the second squeezing portion 102a. This valve body lifting range may be referred to as having an initial valve body lifting (opening) range in which the lift distance of the valve body 58 is not greater than a predetermined lift distance.

Figure 4:
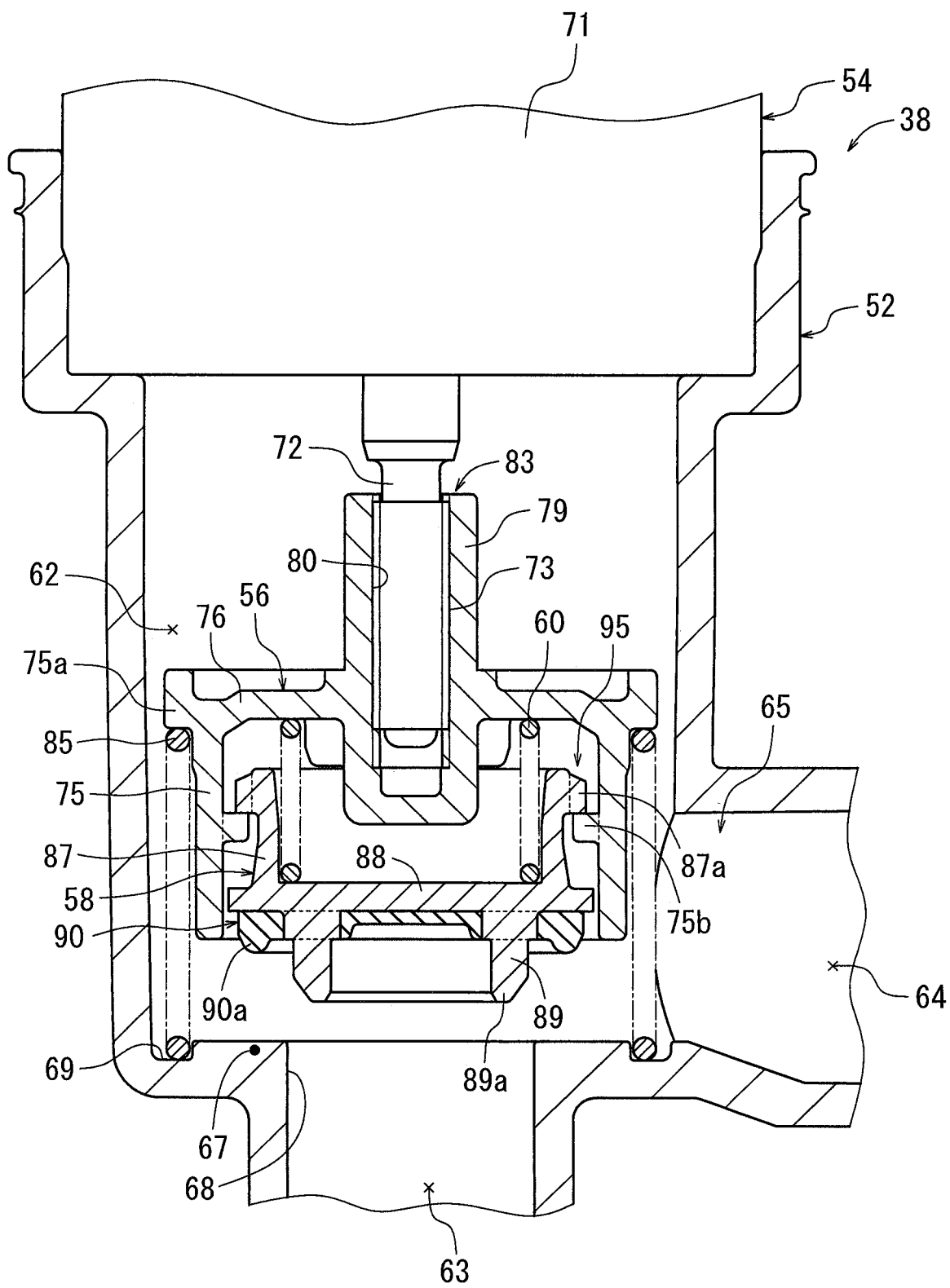
FIG. 4 is a cross-sectional view of the flow control valve of FIG. 1 illustrating a valve opened condition.

Thereafter, when the valve body 58 is lifted up, the hollow cylindrical projecting portion 89 of the valve body 58 is gradually withdrawn from the valve hole 68 of the valve seat 67. Thereafter, when the valve body 58 is further lifted up after the hollow cylindrical projecting portion 89 of the valve body 58 is withdrawn from the valve hole 68 of the valve seat 67 (i.e., after a lower end periphery of the outer circumferential surface of the hollow cylindrical projecting portion 89 except for the chamfered portion 89a is displaced upward beyond an upper end periphery of the valve hole 68 of the valve seat 67), the effective flow passage area of the fluid-flow channel 65 of the shut-off valve 38 may increase in proportion to the lift distance of the valve body 58. As a result, the flow rate of the fluids flowing through the fluid-flow channel 65 linearly increase with respect to the lift distance of the valve body 58. Thus, as shown in FIG. 4, the shut-off valve 38 reaches a valve (fully) opened condition.

In the valve opened condition of the shut-off valve 38, even if the electric motor 54 is de-energized, the shut-off valve 38 can be held in the valve opened condition due to the detent torque of the electric motor 54, the lead angle of the feed screw mechanism 83 (the male thread portion 73 and the female thread portion 80), or other such factors.

In the valve opened condition of the shut-off valve 38, when the electric motor 54 is energized by the ECU 45 for performing a valve-closing operation of the shut-off valve 38, the guide member 56 is lowered with the valve body 58 via the feed screw mechanism 83 contrary to the valve-opening operation. As a result, the sealing portion 90a of the sealing member 90 attached to the valve body 58 contacts the valve seat 67, thereby preventing the valve body 58 from being further lowered. After the sealing portion 90a contacts the valve seat 67, the guide member 56 is solely lowered. As a result, the stopper projections 75b of the guide member 56 are spaced apart from the engagement projections 87a of the valve body 58. That is, the guide member 56 and the valve body 58 are separated or decoupled. Thereafter, the electric motor 54 is deenergized by the ECU 45 before the cylindrical wall portion 75 of the guide member 56 contacts the valve seat 67. Thus, the valve-closing operation is stopped (FIG. 2).

Figure 6:
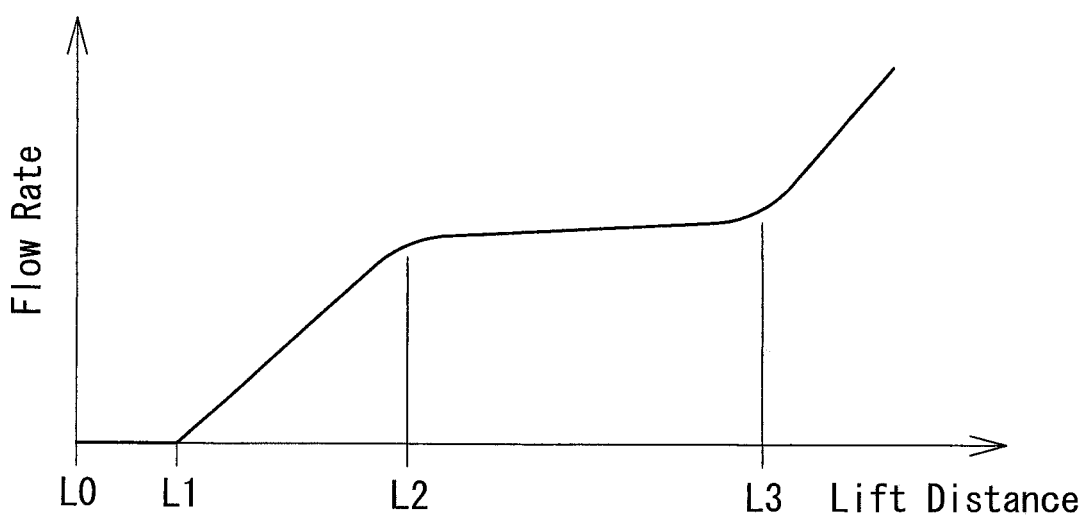
FIG. 6 is a graph showing a relationship between a lift distance of a valve body and a flow rate of fluids.

As shown in FIG. 6, the shut-off valve 38 may have a special characteristics in a relationship between the lift distance the valve body 58 and the flow rate of the fluids flowing through the fluid-flow channel 65. In the valve closed condition (the lift distance: L0), when the valve body 58 starts to be lifted up (the lift distance: L1), i.e., when the sealing portion 90a of the sealing member 90 starts to be spaced apart from the valve seat 67, the flow rate of the fluids may linearly increase at a first rate until the lift distance of the valve body 58 reaches L2. In a range from L1 to L2 (which may be referred to as a first valve body lifting range), the effective flow passage area of the fluid-flow channel 65 of the shut-off valve 38 is defined by the first squeezing portion 101a. Thereafter, until the lift distance of the valve body 58 reaches L3, even when the valve body 58 is further lifted up, the flow rate of the fluids is substantially constant and prevented from being increased. In a range from L2 to L3 (which may be referred to as a second valve body lifting range), the effective flow passage area of the fluid-flow channel 65 of the shut-off valve 38 is defined by the second squeezing portion 102a. Thereafter, when the valve body 58 is further lifted up beyond L3, the flow rate of the fluids linearly increases at a second rate greater than the first rate. The range from L0 to L3 may correspond to the initial valve body lifting range. Further, the range from L2 to L3 may be referred to as a portion of the initial valve body lifting range.

According to the shut-off valve 38, in the initial valve body lifting range in which the lift distance of the valve body 58 is not greater than the predetermined distance, the hollow cylindrical projecting portion 89 of the valve body 58 is positioned in the valve hole 68 of the valve seat 67. Therefore, in the portion of the initial valve body lifting range, the flow rate of the fluids flowing through the fluid-flow channel 65 is prevented from being increased. This means that the flow rate of the fluids flowing through the fluid-flow channel 65 are strictly controlled.

The shut-off valve 38 is configured such that the hollow portion 93 is formed in the valve closed condition. The hollow portion 93 is in fluid communication with the annular space 102 formed between the valve hole 68 of the valve seat 67 and the hollow cylindrical projecting portion 89. As a result, a flow rate control of the fluids by the first squeezing portion 101a can be smoothly and definitely changed to a flow rate control of the fluids by the second squeezing portion 102a. This may reduce fluctuation in the flow rate of the fluids.

The shut-off valve 38 includes the guide member 56 configured to be axially moved by the feed screw mechanism 83, the coupling mechanisms 95 configured to couple or decouple the guide member 56 and the valve body 58, and the valve spring 60 configured to vertically bias the guide member 56 and the valve body 58 axially apart. Therefore, even if a distance between the electric motor 54 and the valve seat 67 is changed due to change of dimension of the housing 52 with temperature change, such a change can be absorbed by relative displacement of the guide member 56 and the valve body 58. This may reduce failure of a sealing performance of the valve body 58 or malfunction of the valve body 58.

Further, according to the evaporated fuel processing device 12 including the shut-off valve 38, when the shut-off valve 38 is opened in order to reduce the tank inner pressure of the fuel tank 15 (i.e., in order to perform a depressurizing operation of the fuel tank 15) before the filler cap 17 is removed, the evaporated fuel within the fuel tank 15 may be prevented from swiftly flowing into the vapor conduit 31, thereby preventing a large dynamic pressure from being generated within the vapor conduit 31. As a result, the ORVR valve 35 and the cut off valve 36 are prevented from being closed due to the dynamic pressure. Thus, the depressurizing operation of the fuel tank 15 can be smoothly performed.

Naturally, various changes and modifications may be made to the embodiment of the shut-off valve 38 disclosed herein. For example, the shut-off valve 38 may be applied to various devices other than the evaporated fuel processing device 12. Further, the guide member 56 may be omitted. The electric motor 54 may be an electric motor including a feed screw mechanism therein and having an (nonrotatable) output shaft that is connected to the feed screw mechanism. In such a case, the output shaft may be integrally connected to the guide member 56. Further, the hollow cylindrical projecting portion 89 formed on the valve body 58 may be replaced with a rectangular hollow cylindrical projecting portion or a solid cylindrical projecting portion. Further, the tapered chamfered portion 89a formed in the hollow cylindrical projecting portion 89 may be omitted as necessary.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

The invention claimed is:

1. A flow control valve, comprising:
   a housing including a fluid-flow channel;
   a valve seat including a valve hole and positioned in the fluid-flow channel;
   an electric motor disposed in the housing; and
   a valve body configured to be axially moved toward and away from the valve seat by the electric motor via a feed screw mechanism,
   wherein the valve body includes a straight projecting portion, and
   wherein the projecting portion is configured to be positioned in the valve hole in an initial valve body lifting range in which a lift distance of the valve body relative to the valve seat is not greater than a predetermined lift distance;
   wherein the valve body includes a sealing member having an annular sealing portion configured to elastically contact the valve seat, and
   wherein a hollow portion is defined between the valve seat, the projecting portion of the valve body, and the sealing portion of the valve body in the condition in which the valve body is seated on the valve seat, the hollow portion being in fluid communication with an annular space formed between an inner surface of the housing defining the valve hole and the projecting portion.

2. The flow control valve of claim 1, further comprising a guide member configured to be axially moved via the feed screw mechanism,
   a coupling mechanism configured to couple the guide member with the valve body when the valve body is moved relative to the valve seat and to decouple the guide member from the valve body when the valve body is seated on the valve seat, and
   a biasing device configured to bias the guide member and the valve body axially apart.

3. An evaporated fuel processing device to process evaporated fuel generated in a fuel tank of a vehicle equipped with an internal-combustion engine, the evaporated fuel processing device comprising:

a canister configured to adsorb and desorb the evaporated fuel;

a vapor conduit connecting the canister and the fuel tank;

a flow control valve configured to open and close the vapor conduit; and a float valve configured to prevent fuel in the fuel tank from flowing into the vapor conduit, wherein the flow control valve comprises a housing including a fluid-flow channel, a valve seat including a valve hole and positioned in the fluid-flow channel, an electric motor disposed in the housing, and a valve body configured to be axially moved toward and away from the valve seat by the electric motor via a feed screw mechanism, wherein the valve body includes a straight projecting portion, and wherein the projecting portion is configured to be positioned in the valve hole in an initial valve body lifting range in which a lift distance of the valve body relative to the valve seat is not greater than a predetermined lift distance;

wherein the valve body includes a sealing member having an annular sealing portion configured to elastically contact the valve seat, and wherein a hollow portion is defined between the valve seat, the projecting portion of the valve body, and the sealing portion of the valve body in the condition in which the valve body is seated on the valve seat, the hollow portion being in fluid communication with an annular space formed between an inner surface of the housing defining the valve hole and the projecting portion.

4. The evaporated fuel processing device of claim 3, wherein the flow control valve further comprises a guide member configured to be axially moved via the feed screw mechanism, a coupling mechanism configured to couple the guide member with the valve body when the valve body is moved relative to the valve seat and to decouple the guide member from the valve body when the valve body is seated on the valve seat, and a biasing device configured to bias the guide member and the valve body axially apart.

* * * * *